US012795486B2

(12) United States Patent
Huang-Fu et al.

(10) Patent No.: US 12,795,486 B2
(45) Date of Patent: Nov. 10, 2026

(54) SUPPORT REDUNDANT PDU SESSION AFTER INTER-SYSTEM CHANGE

(71) Applicant: MEDIATEK INC., Hsin-Chu (TW)

(72) Inventors: Chien-Chun Huang-Fu, Hsin-Chu (TW); Yuan-Chieh Lin, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 539 days.

(21) Appl. No.: 18/088,212

(22) Filed: Dec. 23, 2022

(65) Prior Publication Data

US 2023/0224781 A1 Jul. 13, 2023

Related U.S. Application Data

(60) Provisional application No. 63/297,859, filed on Jan. 10, 2022.

(51) Int. Cl.
*H04W 36/14* (2009.01)
*H04W 36/00* (2009.01)

(52) U.S. Cl.
CPC ....... *H04W 36/14* (2013.01); *H04W 36/0022* (2013.01)

(58) Field of Classification Search
CPC ............. H04W 36/0069; H04W 36/08; H04W 36/0061; H04W 24/04; H04W 60/04; H04W 76/15; H04W 76/11; H04W 28/0257; H04W 60/00; H04W 28/0268; H04W 36/14; H04W 36/002;
(Continued)

(56) References Cited

U.S. PATENT DOCUMENTS

2020/0329397 A1* 10/2020 Huang-Fu ......... H04W 28/0257
2020/0336948 A1* 10/2020 Kawasaki ............. H04W 60/00
(Continued)

FOREIGN PATENT DOCUMENTS

CN 112055993 A 12/2020
WO 020096396 A1 5/2020

OTHER PUBLICATIONS

Taiwan Intellectual Property Office Action 112100851, dated Dec. 23, 2023 (8 pages).
Technical Specification Group Core Network and Terminals; Non-Access-Stratum (NAS) protocol for 5G System (5GS).
Europena Patent Office Written Opinion and search report for application 23150244.4-1215, mailed on Jun. 6, 2023, 12 pages.
Media Tek Inc. "Correction to 5GSM/ESM coordination", 3GPP draft; C1-184422_Correction on interworking, 3GPP, mobile competence center; France (claims 1,6).
(Continued)

*Primary Examiner* — Kathy W Wang-Hurst
*Assistant Examiner* — Garth D Richmond
(74) *Attorney, Agent, or Firm* — Helen Mao; Zheng Jin; Imperium Patent WorksImperium Patent Works

(57) ABSTRACT

A method for supporting redundant PDU session under intersystem change between 5GS and EPS is proposed. A UE maintains a PDU session that is a redundant PDU session, associated with a PDU session pair ID and/or a redundancy sequence number (RSN). When inter-system change from N1 mode to S1 mode occurs, the PDU session is transferred/mapped to a PDN connection. The UE shall associate the PDU session pair ID and/or the RSN with the PDN connection corresponding to the PDU session (e.g., associate with the default EPS bearer context of the PDN connection). When inter-system change from S1 mode to N1 mode occurs, the PDN connection is transferred/mapped back to the PDU session. The UE shall associate the PDU session pair ID and/or the RSN with the PDU session corresponding to the PDN connection.

9 Claims, 4 Drawing Sheets

(58) Field of Classification Search
CPC ....... H04W 36/0022; H04W 36/00222; H04W 88/06; H04W 76/22; H04W 76/10; H04W 76/25; H04W 76/00; H04L 5/0053
See application file for complete search history.

(56) References Cited

U.S. PATENT DOCUMENTS

| | | | | |
|---|---|---|---|---|
| 2020/0359272 | A1* | 11/2020 | Huang-Fu | H04W 36/0033 |
| 2021/0250788 | A1* | 8/2021 | Kim | H04W 24/04 |
| 2022/0053390 | A1* | 2/2022 | Kim | H04W 36/00695 |
| 2022/0104296 | A1* | 3/2022 | Mary | H04L 1/08 |
| 2025/0150885 | A1* | 5/2025 | Song | H04L 41/0894 |

OTHER PUBLICATIONS

Nokia et al. "5GSM protocol update for redundant PDU sessions," 3GPP draft, CP-213054. mobile competence center; France. (Claims 3, 4, 8, 9).
LG Electronics et al."Correction on Redundant PDU session," 3GPP draft; S2-2105572, 3GPP, mobile competence center; France (claims 1-4, 6-9).
Hina Intellectual Property Office Action for 202211721685.X Dated May 29, 2025. (No English Translation available) Cited references listed in this form.
3GPP tsg_salwg2_arch, "S2-2105572_23501_SE_RPS".

* cited by examiner

SUPPORT REDUNDANT PDU SESSION AFTER INTER-SYSTEM CHANGE

CROSS REFERENCE TO RELATED APPLICATIONS

This application claims priority under 35 U.S.C. § 119 from U.S. Provisional Application No. 63/297,859, entitled "Support Redundant PDU Session After Inter-System Change", filed on Jan. 10, 2022, the subject matter of which is incorporated herein by reference.

TECHNICAL FIELD

The disclosed embodiments relate generally to wireless communication, and, more particularly, to method of supporting redundant PDU session after inter-system change.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA, and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The 3rd generation partner project (3GPP) network normally includes a hybrid of 2G/3G/4G systems. The Next Generation Mobile Network (NGMN) board has decided to focus the future NGMN activities on defining the end-to-end requirements for 5G new radio (NR) systems (5GS).

In 5G, a Protocol Data Unit (PDU) session establishment procedure is a parallel procedure of a Packet Data Network (PDN) connection procedure in 4G. A PDU session defines the association between the UE and the data network that provides a PDU connectivity service. Each PDU session is identified by a PDU session ID, and includes one or more QoS flows and QoS rules. When an application is executed, the upper layer sends the application information to the route selection policy (URSP) entity for matching a URSP rule, and use the corresponding RSD (Route Selection Descriptor) to associated with an existing PDU session or to establish a new PDU session.

The concept of "redundant PDU session" is introduced for URLLC (Ultra Reliable and Low Latency Communication) applications. The 5GSM sublayer may support establishment of redundant PDU sessions. In order to establish a set of two redundant PDU sessions, a UE can include a PDU session pair ID, a Redundancy Sequence Number (RSN), or both in a PDU SESSION ESTABLISHMENT REQUEST message for each of the two redundant PDU sessions. The UE can set the PDU session pair ID, the RSN, or both according to URSP or UE local configuration.

To ensure the reliability and low latency for URLLC applications, the corresponding redundant PDU sessions should be established over 3GPP access. It is not defined whether a redundant PDU session can be supported when the redundant PDU session is transferred to EPS upon intersystem change and back to 5GS.

A solution is sought.

SUMMARY

A method for supporting redundant PDU session under intersystem change between 5GS and EPS is proposed. A UE maintains a PDU session that is a redundant PDU session, associated with a PDU session pair ID and/or a redundancy sequence number (RSN). When inter-system change from N1 mode to S1 mode occurs, the PDU session is transferred to a corresponding PDN connection. The UE shall associate the PDU session pair ID and/or the RSN with the corresponding PDN connection (e.g., associate with the default EPS bearer context of the PDN connection). When inter-system change from S1 mode to N1 mode occurs, the PDN connection is transferred/mapped back to the PDU session. The UE shall associate the PDU session pair ID and/or the RSN (originally associated with the PDN connection) with the corresponding PDU session.

In one embodiment, a UE maintains a protocol data unit (PDU) session in a 5G mobile communication network, wherein the PDU session is associated with at least one of a PDU session pair ID and a redundancy sequence number (RSN). The UE performs a first intersystem change from N1 mode to S1 mode, wherein the PDU session in 5G is transferred/mapped to a packet data network (PDN) connection in 4G. The UE associates the at least one of the PDU session pair ID and the RSN to a default EPS bearer context of the PDN connection. The UE performs a second intersystem change from S1 mode to N1 mode, wherein the PDN connection is transferred/mapped back to the PDU session, and wherein the UE associates the at least one of the PDU session pair ID and the RSN to the PDU session.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
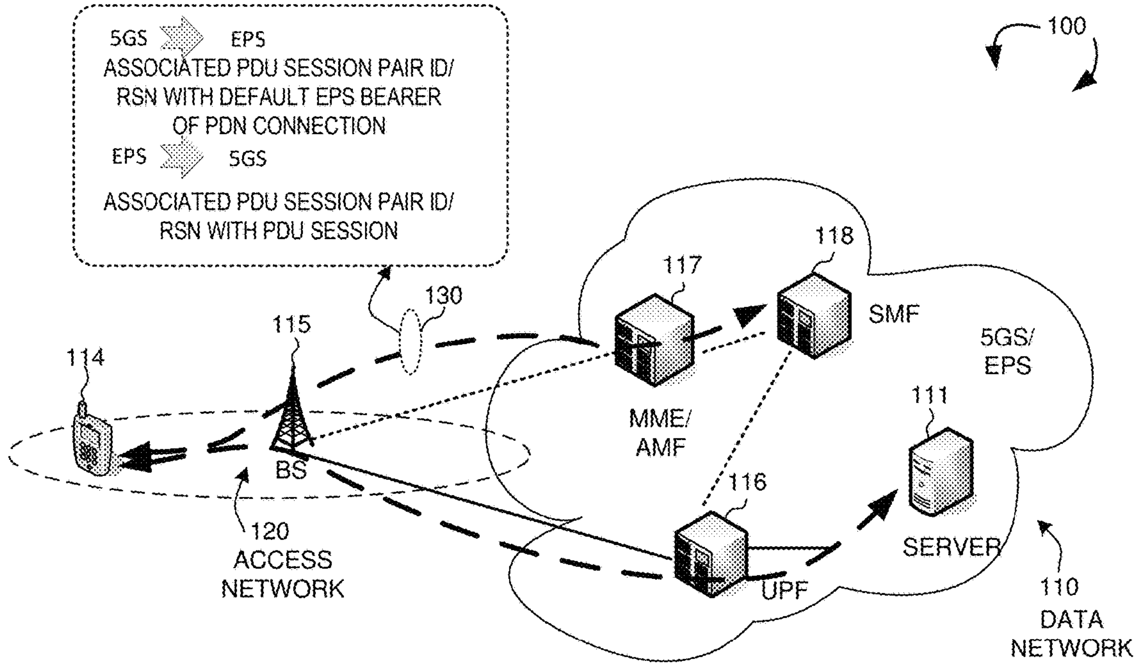
FIG. 1 illustrates an exemplary EPS/5GS network supporting redundant PDU session handling in 5GS under intersystem change in accordance with one novel aspect of the present invention.

FIG. 1 illustrates an exemplary EPS/5GS network 100 supporting redundant PDU session handling in 5GS under intersystem change in accordance with one novel aspect of the present invention. LTE/NR network 100 comprises data network 110 and application server 111 that provides various services by communicating with a plurality of user equipments (UEs) including UE 114. In the example of FIG. 1, UE 114 and its serving base station BS 115 belong to part of a radio access network RAN 120. RAN 120 provides radio access for UE 114 via a radio access technology (RAT). Application server 111 communicates with UE 114 through User Plane Function (UPF) 116 and BS/gNB 115. A mobility management entity (MME) or an access and mobility management function (AMF) 117 communicates with BS 115 for access and mobility management of wireless access devices in LTE(4G)/NR(5G) network 100. A Session Management Function (SMF) 118 is primarily responsible for interacting with the decoupled data plane, creating, updating, and removing Protocol Data Unit (PDU) sessions and managing PDU session context with UPF 116. UE 114 may be equipped with a radio frequency (RF) transceiver or multiple RF transceivers for different application services via different RATs/CNs. UE 114 may be a smart phone, a wearable device, an Internet of Things (IoT) device, and a tablet, etc.

EPS and 5GS networks are packet-switched (PS) IP networks. This means that the networks deliver all data traffic in IP packets. When UE joins an LTE network, a Packet Data Network (PDN) address (i.e., the one that can be sued on the PDN) is assigned to the UE for its connection to the PDN. LTE calls the users "IP access connection" an evolved packet system (EPS) bearer/PDN connection, which is a connection between the UE and the PDN gateway (PGW). The PGW is the default gateway for the UEs IP access. LTE has defined a Default EPS Bearer to provide the IP Connectivity.

When UE joins a 5GS network, a Packet Data Network (PDN) address (i.e., the one that can be used on the PDN) is assigned to the UE for its connection to the PDN. In 4G, EPS has defined a Default EPS Bearer for PDN connection to provide the IP Connectivity. In 5G, a Protocol Data Unit (PDU) session establishment procedure is a parallel procedure of a PDN connectivity procedure in 4G. A PDU session (e.g., 130) defines the association between the UE and the data network that provides a PDU connectivity service. Each PDU session is identified by a PDU session ID.

The concept of "redundant PDU session" is introduced for URLLC (Ultra Reliable and Low Latency Communication) applications. The 5GSM sublayer may support establishment of redundant PDU sessions. In order to establish a set of two redundant PDU sessions, a UE can include a PDU session pair ID, an RSN, or both in a PDU SESSION ESTABLISHMENT REQUEST message for each of the two redundant PDU sessions. The UE can set the PDU session pair ID, the redundancy sequency number (RSN), or both according to URSP or UE local configuration. To ensure the reliability and low latency, the corresponding redundant PDU session should be established over 3GPP access. It is not defined whether a redundant PDU session can be supported when the redundant PDU session is transferred to EPS and back to 5GS upon intersystem change (s).

In one novel aspect, a method for supporting redundant PDU session under intersystem change between 5GS and EPS is proposed. As depicted by FIG. 1, UE 114 maintains a PDU session 130 that is a redundant PDU session, associated with a PDU session pair ID and/or a redundancy sequence number (RSN). When inter-system change from 5GS to EPS (e.g., N1 mode to S1 mode) occurs, the PDU session is transferred to a corresponding PDN connection. UE 114 associates the PDU session pair ID and/or the RSN (originally associated with the PDU session) with the corresponding PDN connection (e.g., associate with the default EPS bearer context of the PDN connection). When intersystem change from S1 mode to N1 mode occurs, the PDN connection is transferred/mapped back to the PDU session. UE 114 associates the PDU session pair ID and/or the RSN (originally associated with the PDN connection) with the corresponding PDU session.

Figure 2:
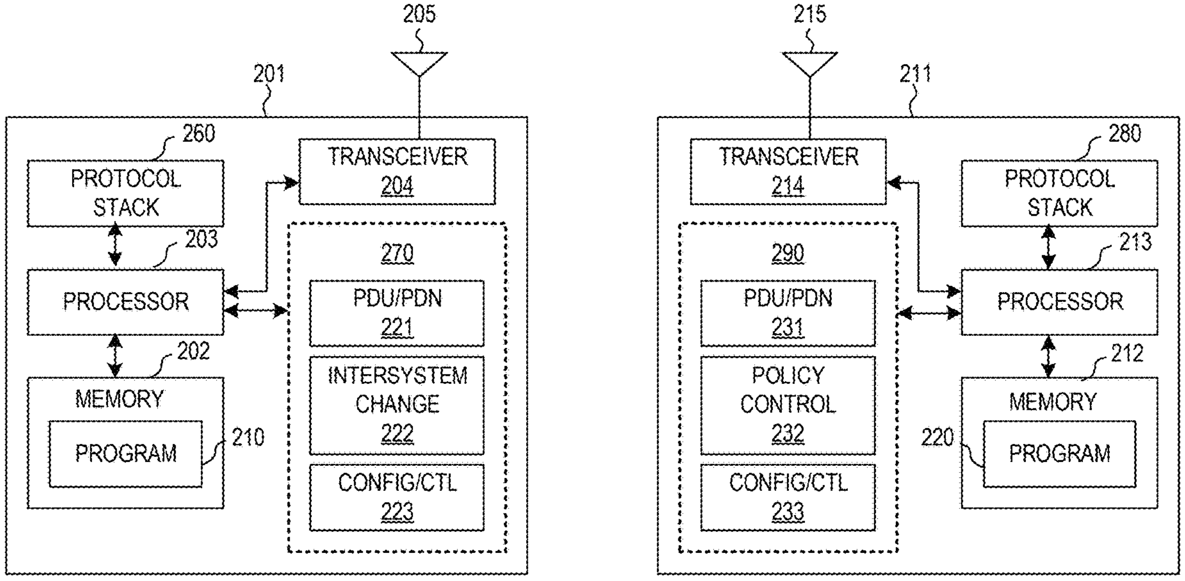
FIG. 2 illustrates simplified block diagrams of a user equipment (UE) and a base station in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control functional modules and circuit 290. PDU session handling circuit 231 handles PDU session establishment and modification procedures. Policy control module 232 that configures policy rules for UE. Configuration and control circuit 233 provides different parameters to configure and control UE of related functionalities including mobility management and session management. The Network entity 211 can be one network element or more network elements (e.g., RAN node+AMF+SMF . . . ).

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise application layer and other upper layers to manage different applications, Non-Access-Stratum (NAS) layer to communicate with an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, the upper layer entities request information of the PDU session via which to send a PDU of an application, system modules and circuits 270 comprise a PDU session handling circuit 221 that performs PDU session establishment and modification procedures with the network, an intersystem change handling circuit 222 that handles intersystem change, and a configuration and control circuit 223 that handles configuration and control parameters for mobility management and session management.

Figure 3:
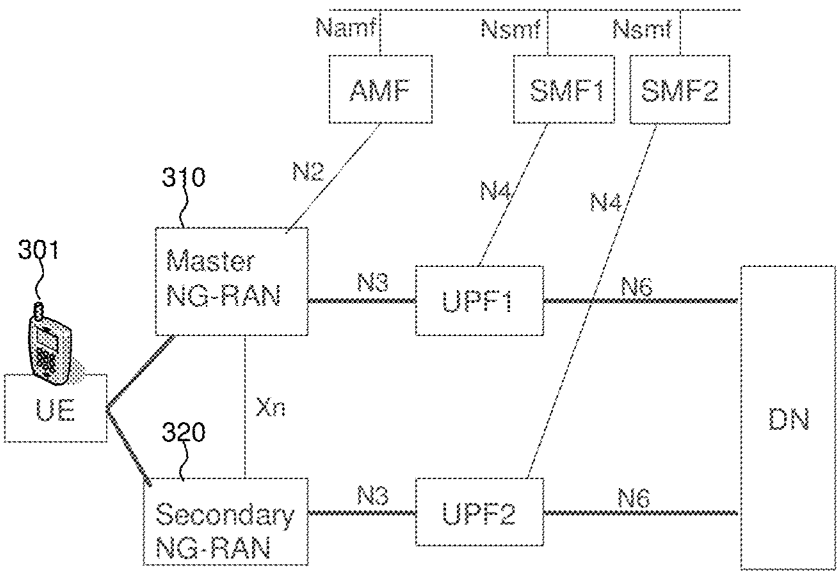
FIG. 3 illustrates an example of user plane configuration for a UE with redundant PDU sessions when redundant transmission is applied for high reliability communication.

FIG. 3 illustrates an example of user plane configuration for a UE with redundant PDU sessions when redundant transmission is applied for high reliability communication. In order to support for Ultra Reliability Low Latency Communication (URLLC) services, redundant transmission for high reliability communication can be achieved via dual connectivity based end-to-end redundant user plane paths. In the example of FIG. 3, for highly reliable URLLC services, UE 301 set up two redundant PDU Sessions over the 5G network, such that the 5GS sets up the user plane paths of the two redundant PDU Sessions to be disjoint. One PDU Session spans from the UE via Master NG-RAN (310) to UPF1 acting as the PDU Session Anchor, and the other PDU Session spans from the UE via Secondary NG-RAN (320) to UPF2 acting as the PDU Session Anchor. NG-RAN may realize redundant user plane resources for the two PDU Sessions with two NG-RAN nodes (i.e., the Master NG-RAN 310 and the Secondary NG-RAN 320 as shown in FIG. 3), or a single NG-RAN node. In both cases, there is a single N1 interface towards AMF. Based on these two PDU Sessions, two independent user plane paths are set up. UPF1 and UPF2 connect to the same Data Network (DN), even though the traffic via UPF1 and UPF2 may be routed via different user plane nodes within the DN.

In the example of FIG. 3, UE 301 initiates two redundant PDU Sessions via a PDU session establishment procedure. UE 301 provides a PDU Session Pair ID (optional) and a Redundancy Sequence Number (RSN) (optional). Different combinations of RSN, DNN and S-NSSAI are used for each PDU Session within a given pair of redundant PDU Sessions. Different combinations of PDU Session Pair ID, DNN and S-NSSAI are used between the different pairs of redundant PDU Session. In one example, UE 301 provides a PDU Session Pair ID and/or an RSN in each of the PDU Session Establishment Request message when it establishes the redundant PDU Sessions. UE 301 determines the PDU Session Pair ID and/or the RSN based on UE local mechanism or the matched URSP rules.

Figure 4:
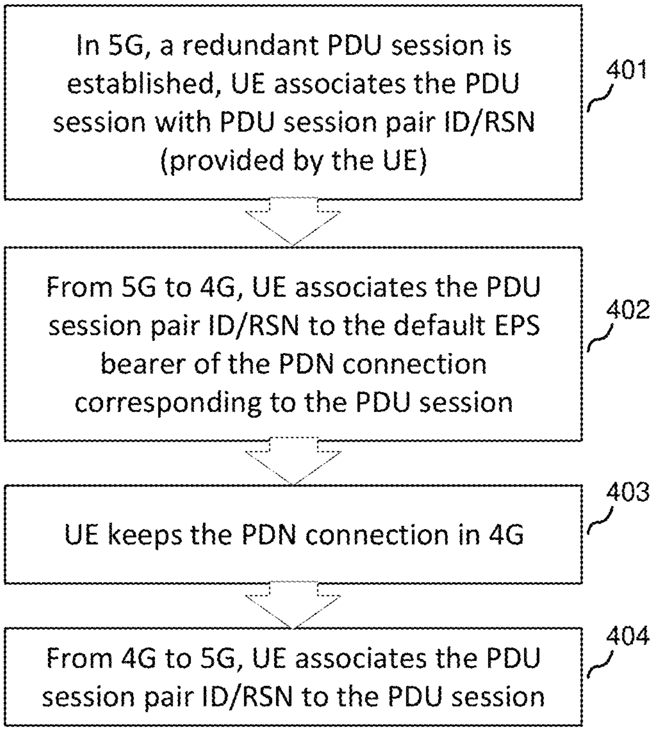
FIG. 4 illustrates the UE behavior of handling a redundant PDU session under intersystem change from N1 mode to S1 mode and from S1 mode back to N1 mode.

FIG. 4 illustrates the UE behavior of handling a redundant PDU session under intersystem change from N1 mode to S1 mode and from S1 mode back to N1 mode. A redundant PDU session is first established in 5GS, e.g., a UE-requested PDU session establishment procedure accepted by the network. Upon receipt of the PDU SESSION ESTABLISHMENT ACCEPT message, if the UE includes the PDU Session Pair ID in the PDU SESSION ESTABLISHMENT REQUEST message, the UE shall associate the PDU session with the PDU session pair ID. If the UE includes the RSN in the PDU SESSION ESTABLISHMENT REQUEST message, the UE shall associate the PDU session with the RSN (401).

Next, there are certain coordination between the 5GS session management (5GSM) and the EPS session management (ESM), e.g., the coordination between 5GSM and ESM with N26 interface. If the PDU session is associated with a PDU session pair ID, after inter-system change from N1 mode to S1 mode, the UE shall associate the default EPS bearer context of the PDN connection corresponding to the PDU session with the PDU session pair ID. If the PDU session is associated with an RSN, after inter-system change from N1 mode to S1 mode, the UE shall associate the default EPS bearer context of the PDN connection corresponding to the PDU session with the RSN (402).

In 4G EPS, the UE keeps the PDN connection transferred from the redundant PDU session (403). If the default EPS bearer context of the PDN connection is associated with the PDU session pair ID, and the PDN connection supports interworking to 5GS, after inter-system change from S1 mode to N1 mode, the UE shall associate the PDU session corresponding to the PDN connection with the PDU session pair ID. If the default EPS bearer context of the PDN connection is associated with the RSN, and the PDN connection supports interworking to 5GS, after inter-system change from S1 mode to N1 mode, the UE shall associate the PDU session corresponding to the PDN connection with the RSN (404).

Figure 5:
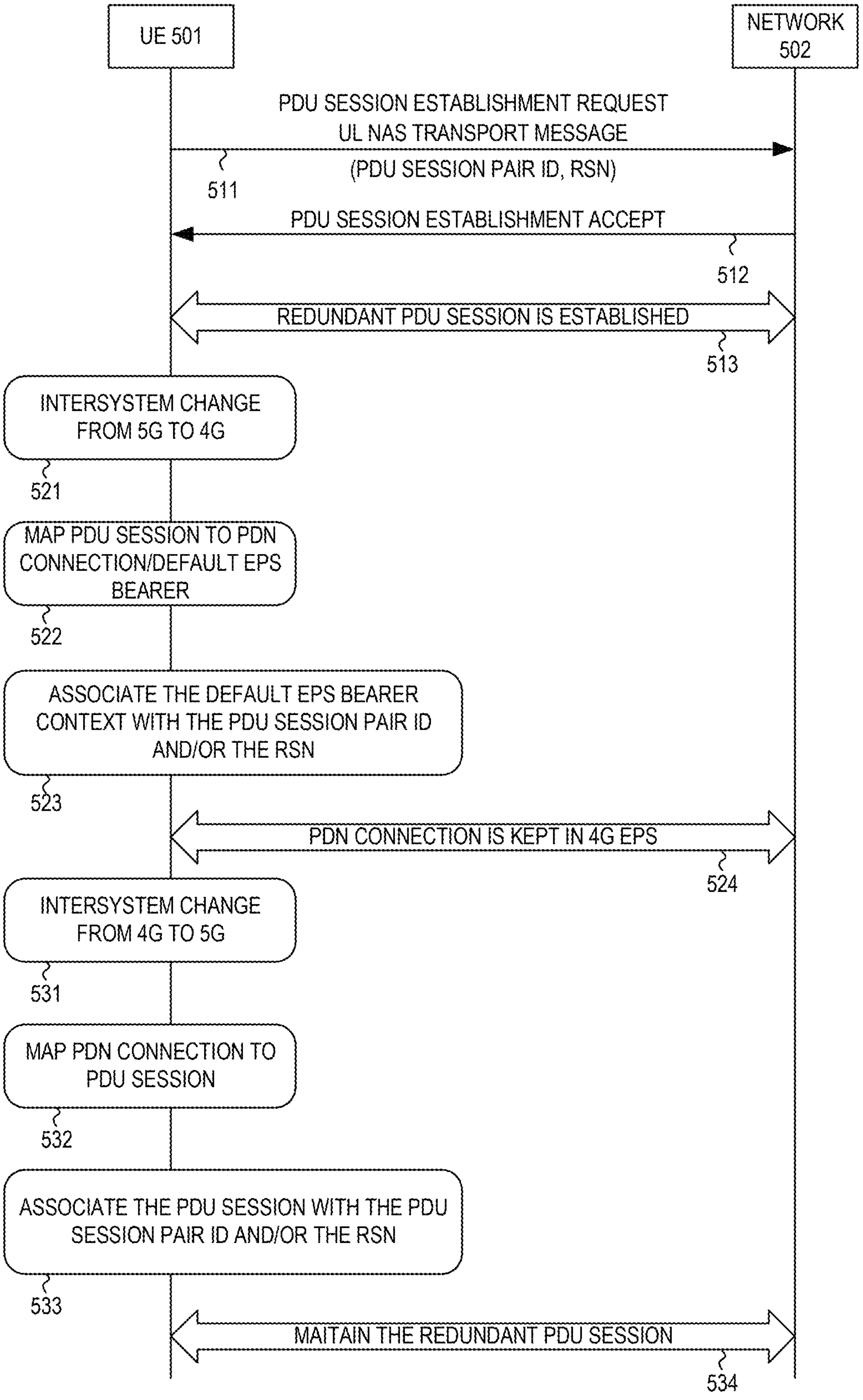
FIG. 5 illustrates a sequence flow between a UE and the network for redundant PDU session handling under intersystem change in accordance with one novel aspect of the present invention.

FIG. 5 illustrates a sequence flow between a UE and the network for redundant PDU session handling under intersystem change in accordance with one novel aspect of the present invention. In step 511, UE 501 transmits a PDU SESSION ESTABLISHMENT REQUEST (UL TRANSPORT) message to network 502 in 5GS, to establish one or more redundant PDU sessions. The PDU SESSION ESTABLISHMENT REQUEST message carries a PDU SESSION PAIR ID, and/or RSN, indicating that the PDU session(s) is/are redundant PDU session(s). In step 512, UE 501 receives a PDU SESSION ESTABLISHMENT ACCEPT message from network 502. In step 513, the one or more redundant PDU sessions are established. Note that UE 501 associates the redundant PDU session(s) with the PDU SESSION PAIR ID and/or RSN provided by the UE in the PDU SESSION ESTABLISHMENT REQUEST message. The established redundant PDU session(s) can then be used for highly reliable URLLC services.

In step 521, UE 501 performs intersystem change from 5GS to EPS, e.g., from N1 mode to S1 mode. In step 522, the redundant PDU session(s) are mapped/transferred to corresponding PDN connection(s), each PDN connection is associated with a default EPS bearer context. In step 523, UE 501 associates the default EPS bearer context with the PDU session pair ID (which was originally associated with the corresponding PDU session). UE 501 also associates the default EPS bearer context of the PDN connection with the RSN (which was originally associated with the corresponding PDU session). In step 524, UE 501 keeps the PDN connection(s) for data communication in EPS.

In step 531, UE 501 performs intersystem change from EPS to 5GS, e.g., from S1 mode to N1 mode. In step 532, the PDN connection(s) are mapped/transferred back to the PDU session(s). In step 533, UE 501 associates the PDU session(s) with the PDU session pair ID (which was originally associated with the corresponding default EPS bearer context of the PDN connection). UE 501 also associates the PDU session(s) with the RSN (which was originally associated with the corresponding default EPS bearer context of the PDN connection). In step 534, UE 501 maintains the redundant PDU session(s) for highly reliable URLLC services in 5GS. In one alternative embodiment, the PDU session pair ID and/or the RSN can be provided by the network.

Figure 6:
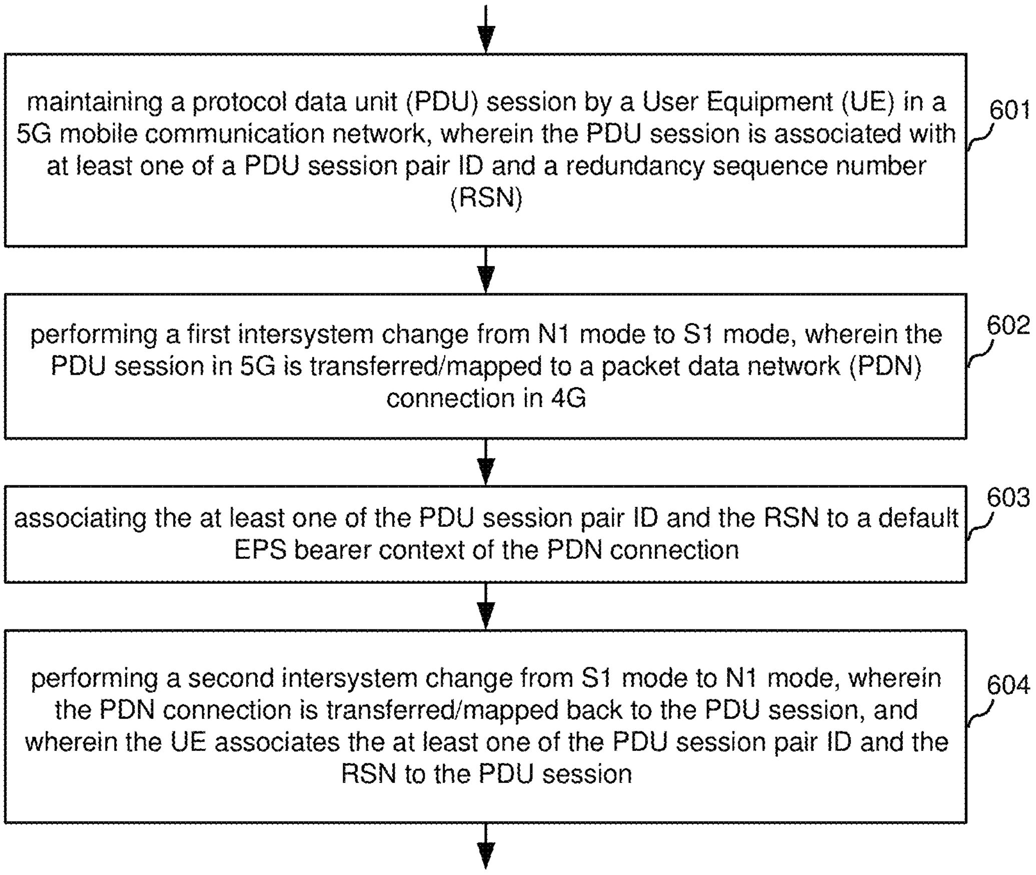
FIG. 6 is a flow chart of a method of redundant PDU session handling under intersystem change in accordance with one novel aspect of the present invention.

FIG. 6 is a flow chart of a method of redundant PDU session handling under intersystem change in accordance with one novel aspect of the present invention. In step 601, a UE maintains a protocol data unit (PDU) session in a 5G mobile communication network, wherein the PDU session is associated with at least one of a PDU session pair ID and a redundancy sequence number (RSN). In step 602, the UE performs a first intersystem change from N1 mode to S1 mode, wherein the PDU session in 5G is transferred/mapped to a packet data network (PDN) connection in 4G. In step 603, the UE associates the at least one of the PDU session pair ID and the RSN to a default EPS bearer context of the PDN connection. In step 604, the UE performs a second intersystem change from S1 mode to N1 mode, wherein the PDN connection is transferred/mapped back to the PDU session, and wherein the UE associates the at least one of the PDU session pair ID and the RSN to the PDU session.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:

maintaining a protocol data unit (PDU) session by a User Equipment (UE) in a 5G mobile communication network, wherein the PDU session is associated with at least one of a PDU session pair ID and a redundancy sequence number (RSN);

performing, by the UE, a first intersystem change from N1 mode to S1 mode, wherein the PDU session in 5G is mapped to a packet data network (PDN) connection in 4G;

associating, by the UE, the at least one of the PDU session pair ID and the RSN to a default evolved packet system (EPS) bearer context of the PDN connection corresponding to the PDU session after the first intersystem change;

performing, by the UE, a second intersystem change from S1 mode to N1 mode, wherein the PDN connection is mapped to the PDU session; and associating, by the UE, the at least one of the PDU session pair ID and the RSN to the PDU session corresponding to the PDN connection after the second intersystem change.

2. The method of claim 1, wherein the PDU session is established by a UE-initiated PDU session establishment request message.

3. The method of claim 2, wherein the PDU session establishment request message comprises the at least one of the PDU session pair ID and the RSN.

4. The method of claim 3, wherein the UE associates the at least one of the PDU session pair ID and the RSN provided by the UE in the PDU session establishment request message to the PDU session.

5. A User Equipment (UE), comprising:

a memory; and a processor coupled to the memory, the processor configured to maintain a PDU session in a 5G mobile communication network, wherein the PDU session is associated with at least one of a PDU session pair ID and a redundancy sequence number (RSN);

perform a first intersystem change from N1 mode to S1 mode, wherein the PDU session in 5G is mapped to a packet data network (PDN) connection in 4G;

associate the at least one of the PDU session pair ID and the RSN to a default evolved packet system (EPS) bearer context of the PDN connection corresponding to the PDU session after the first intersystem change;

perform a second intersystem change from S1 mode to N1 mode, wherein the PDN connection is mapped to the PDU session; and associate the at least one of the PDU session pair ID and the RSN to the PDU session corresponding to the PDN connection after the second intersystem change.

6. The UE of claim 5, wherein the PDU session is established by a UE-initiated PDU session establishment request message.

7. The UE of claim 6, wherein the PDU session establishment request message comprises the at least one of the PDU session pair ID and the RSN.

8. The UE of claim 7, wherein the UE associates the at least one of the PDU session pair ID and the RSN provided by the UE in the PDU session establishment request message to the PDU session.

9. The UE of claim 5, wherein the UE initiates two redundant PDU sessions, and wherein the PDU session belongs to one of the two redundant PDU sessions.

* * * * *